Nov. 26, 1968  J. H. ROSE ETAL  3,412,968
MULTIPLE POSITION VEHICLE SEAT ASSEMBLY
Filed Feb. 20, 1967  2 Sheets-Sheet 1

INVENTORS.
JACK H. ROSE &
BY FREDERICK W. DUVALL

Tweedale & Gerhardt
ATTORNEYS.

United States Patent Office 3,412,968
Patented Nov. 26, 1968

3,412,968
MULTIPLE POSITION VEHICLE SEAT ASSEMBLY
Jack H. Rose, Livonia, and Frederick W. Du Vall, Belleville, Mich., assignors to Massey-Ferguson, Inc., Detroit, Mich.
Filed Feb. 20, 1967, Ser. No. 617,303
4 Claims. (Cl. 248—425)

ABSTRACT OF THE DISCLOSURE

A multiple position seat for vehicle mounted material handling equipment, such as backhoes, wherein the seat may be moved from a driving position to a backhoe operating position.

Summary of the invention

A seat assembly in accordance with the present invention includes a frame mounted on a tractor having spaced front and rear platform portions. A seat supporting base member is connected with the frame by a hinge in such a manner that the base member is movable between the platform portions of the frame, and is selectively rotatable to face in opposite directions on the platforms.

For a relatively heavy seat, the hinge may be spring-loaded to assist moving the seat between the platform portions, and latch members are provided to hold the seat in position against the spring force on the platform portions.

Description of the preferred embodiment

Figure 1:
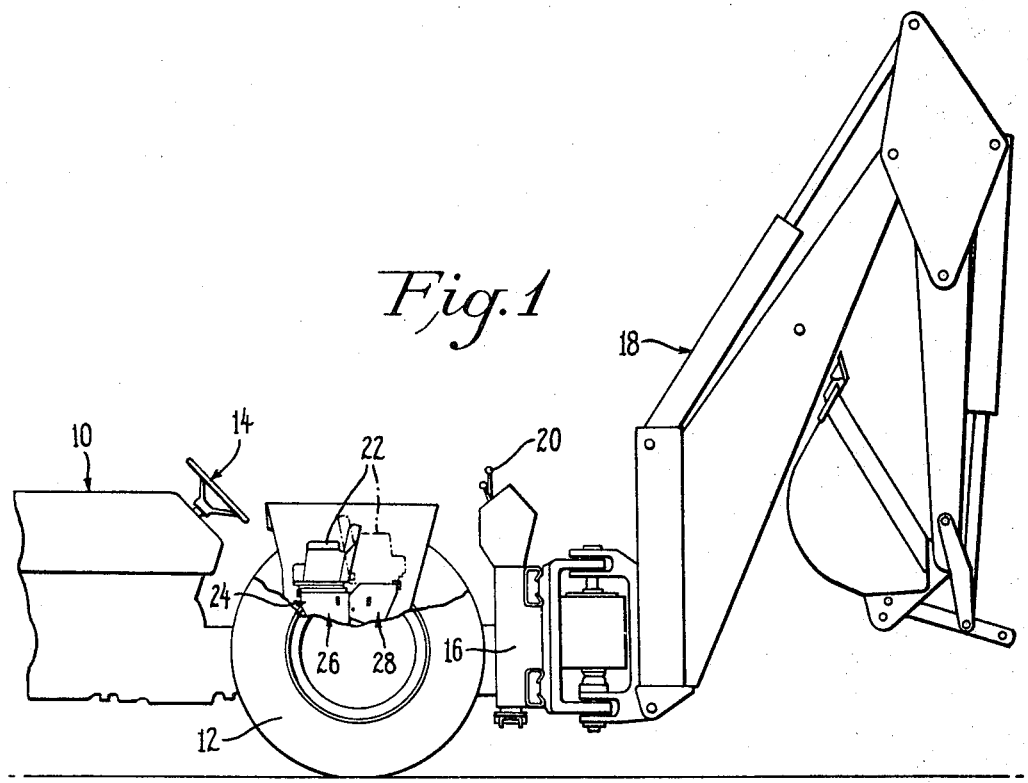
FIG. 1 is a partial elevation view of a tractor mounted backhoe having a seat assembly embodying the invention.

FIG. 1 illustrates a tractor 10 having rear wheels 12 and a steering wheel 14. Mounted on the rear end of tractor 10 is a supporting frame 16 for a backhoe designated collectively by reference numeral 18. Backhoe 18 is operated hydraulically by manipulation of control handles 20 supported above frame 16. Mounted on the tractor frame is a seat 22 for the operator which is shown in solid lines in its forwardly facing, tractor driving position, and in phantom lines in its rearwardly facing, backhoe operating position.

Seat 22 is mounted on a frame 24 including front and rear portions 26 and 28, respectively. The front portion 26 is mounted on the tractor chassis 30 and the rear portion 28 is secured to the rear axle housing 32 of the tractor. The rear portion 28 includes a top wall or panel 34 and depending side walls or panels 36 and 38. A slot 40 is formed in the top wall 34 and extends rearwardly from the forward edge thereof. The front portion 26 includes a top wall 42 having depending side walls 44 and 46. Top wall 42 is formed with a slot 48 which communicates with slot 40. Top walls 42 and 34 respectively define front and rear seat supporting platforms.

Figure 3:
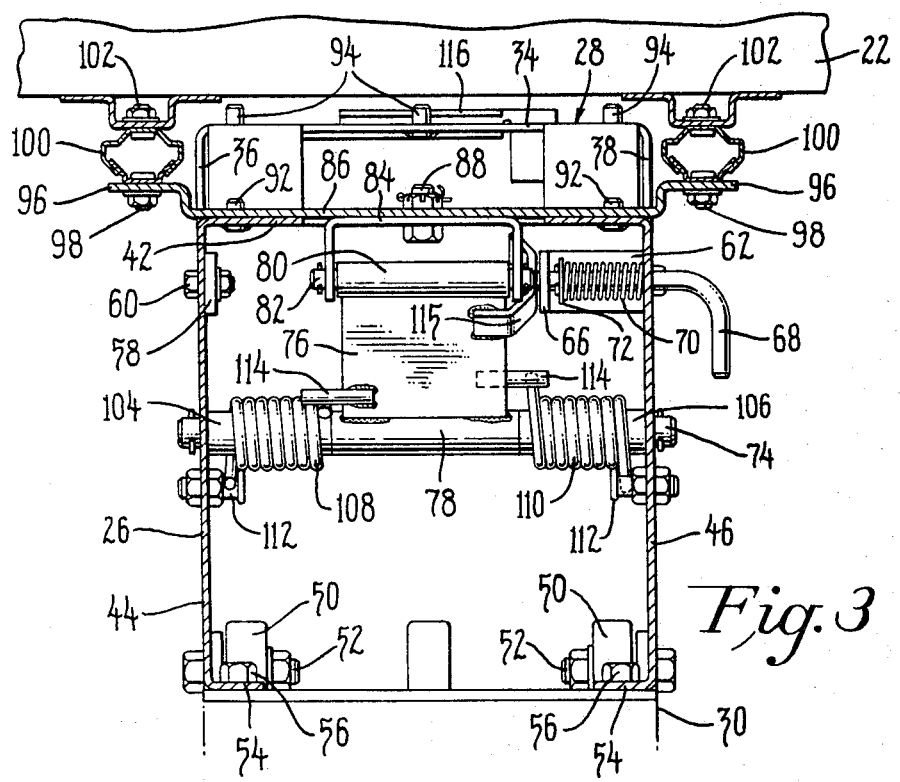
FIGS. 3 and 4 are sectional views taken on lines 3—3 and 4—4, respectively, of FIG. 2.

The rear frame portion 28 is secured to a lug 50 on the rear axle housing 32 by means of bolts 52 passing through side walls 36 and 38. Side walls 44 and 46 of the front frame portion 26 are formed with inwardly projecting flanges 54 secured to the tractor chassis 30 by means of bolts 56 (FIG. 3). The front and rear frame portions 26 and 28, are secured together by a strap 58 attached by fasteners 60 to the side walls 44 and 36. The opposite panels 46 and 38 are secured together by a strap 62 and fasteners 64, the strap 62 being formed at its ends with offset bracket portions 66. Bracket portions 66 are apertured to receive latching plungers 68 and 69 mounted in side panels 46 and 38, respectively, which are biased to project into the apertured bracket portions 66 by springs 70 seated between the side panels and the spring seat washers 72 on the ends of the plungers.

Figure 4:
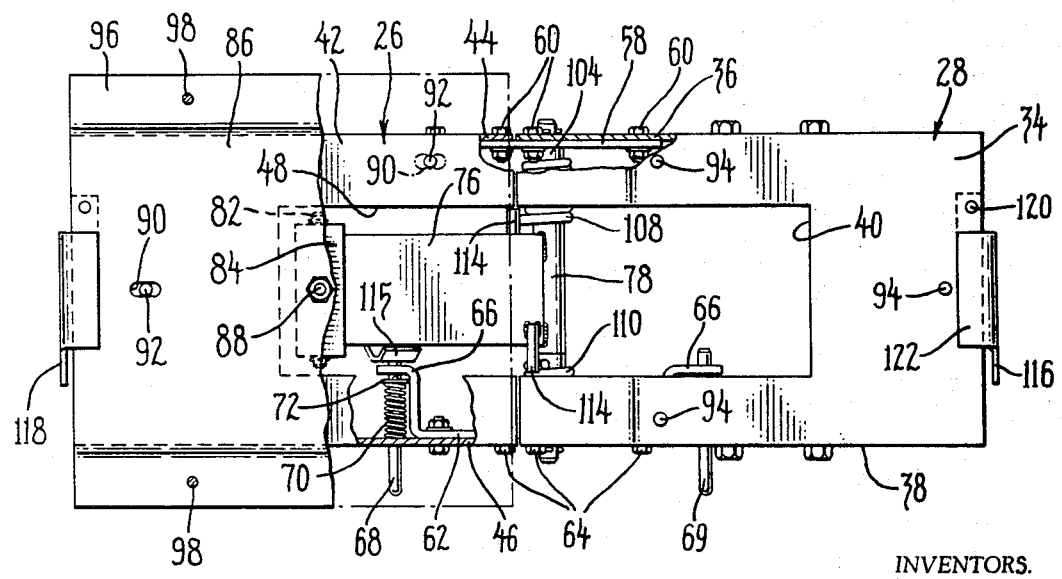

Mounted between the side walls 36 and 38 of frame member 28 is a shaft 74 for a hinge member 76 having a hollow sleeve member 78 rotatably mounted on shaft 74. Mounted within a sleeve portion 80 at the free end of hinge 76 is a pin 82 which pivotally supports the legs of a U-shaped bracket 84. Rotatably secured to bracket 84 in a conventional fastener 88 is a seat base member 86. Base member 86 is therefore movable between a position in which it rests on the top panel or platform 42 of the front frame member 26 and a position in which it rests on the top panel or platform 34 of the rear frame member 28. When base member 86 rests on the front platform 42, slots 90 formed in the base member receive pins 92 projecting upwardly from panel 42 to prevent rotation of the base member about bolt 88. Similarly, pins 94 project upwardly from the rear platform 34 to engage slots 90 when base member 86 is moved to the backhoe operating position. As illustrated in FIG. 4, the pins 92, 94 are arranged with respect to each other such that they will engage slots 90 only when base member 86 is rotated 180 degrees as it moves from one of the platforms to the other.

Base member 86 is formed with laterally projecting support flanges 96 for a track assembly 100. The base portion of the track assembly is secured to flange 96 by bolts 98, and the seat portion is secured by bolts 102 to brackets on the bottom of a seat 22. The track assembly 100 permits the seat 22 to be adjusted along the length of base member 86.

Figure 2:
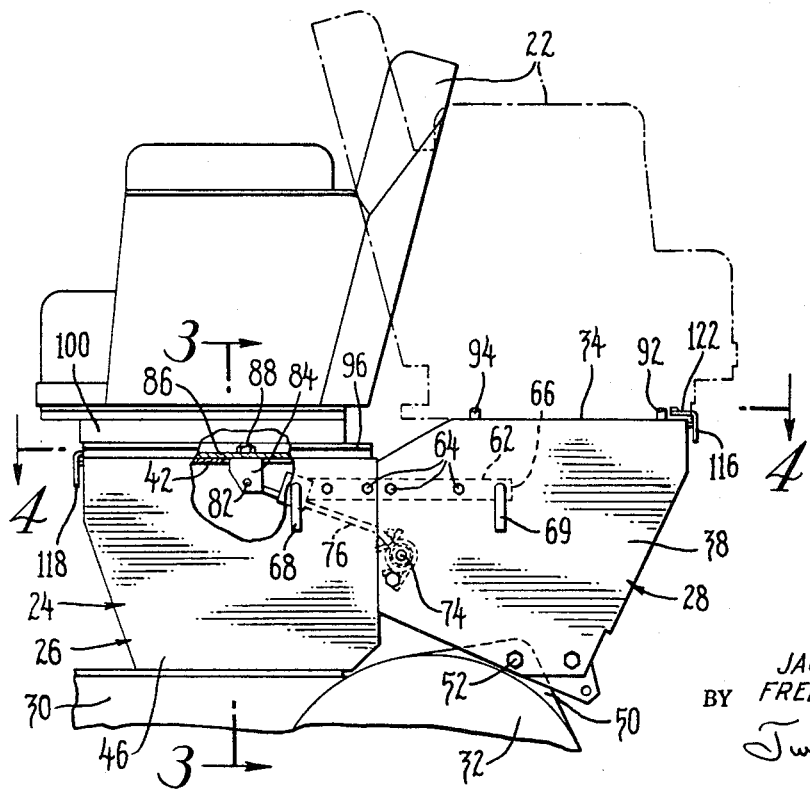
FIG. 2 is an elevational view of the seat assembly of FIG. 1.

With reference to FIGS. 3 and 4, spacers 104 and 106 are mounted on shaft 74 on opposite sides of hinge 76. Mounted on spacers 104 and 106 are torsion springs 108 and 110, respectively, the ends of which engage stop members 112 and 114 mounted respectively on the side panels of frame member 28 and hinge member 76. Springs 108 and 110 are engaged with their respective stop members in such a manner that movement of the seat to the full line position in FIG. 2 causes spring 108 to wind up around spacer 104, and spring 110 to unwind about spacer 106. Springs 108 and 110 are in their neutral, or balanced condition when the seat and base member 86 are in an intermediate position between the top panels of frame portions 26 and 28 at approximately the level of the backhoe platform portion 34, which is elevated above the tractor platform 42 in the illustrated embodiment. When the seat is moved to its phantom line or backhoe operating position shown in FIG. 2, spring 110 tends to wind up around spacer 106 and spring 108 tends to unwind.

A latching bar 115 is welded or otherwise secured to hinge 76 and is provided with an aperture for receiving the latching plungers 68 and 69 when the seat rests respectively on the front and rear platforms 42 and 34. Engagement of the latches 68 or 69 with the latching bar 115 locks the seat in position against the force of the torsion springs 108 and 110. The seat is further secured against movement from either its forward or rearwardly facing position by thumb latches 116 and 118 mounted respectively on top panels 34 and 42. Latch member 116 is pivotally secured at 120 to panel 34 and has a flange 122 which overlies the forward edge of base member 86 when the seat is in the backhoe operating position as shown in phantom lines in FIG. 2. Latch member 118 is of identical construction.

When the operator wishes to move the seat from the tractor operating position to the backhoe operating position, he releases latch 68 and the thumb latch 118 and the torsion springs 108 and 110 raise the seat to approximately the level of the backhoe position. The operator then turns the seat 180 degrees about bolt 88 and moves it onto the rear platform 28 and engages latch 69 and thumb latch 116 to secure the seat in position. The seat is secured in position by latches 69 and 116 and the engagement of pins 94 with slots 90.

While a specific embodiment of the invention has been illustrated and described in the foregoing specification, the invention is not limited to the exact construction shown. Various alternatives in the construction and arrangement of parts, all falling within the scope and spirit of the invention, will be apparent to those skilled in the art.

We claim:

1. A vehicle seat assembly comprising: a frame having a pair of spaced platforms, a hinge member having one end pivotally mounted on said frame, a seat supporting base member, means mounting the base member on the other end of the hinge member for selective rotation about an axis normal to the pivotal axis between the frame and said one end of the hinge member, such that pivotal movement of the hinge relative to the frame moves the base member between a first position resting on one of the platforms and a second position resting on the other platform, and said base member is selectively rotatable about said normal axis between positions facing in different directions as it moves from one to the other of said platforms, said assembly further including spring means connected between the hinge member and the frame biasing the hinge member to move said base member to an intermediate position between the platforms such that said base member is spring-loaded to move off each platform, and latching means for securing the base member against undesired movement from either of the platforms.

2. A vehicle seat assembly as claimed in claim 1 further including interengageable means on the base member and the platforms for preventing rotation of the base member relative to the associated platform in either the first or second position.

3. A vehicle seat assembly as claimed in claim 2 wherein said interengageable means comprises a plurality of pins projecting from one of said base member and associated platform, and a plurality of slots equal in number to the pins formed in the other of said base member and associated platform for receiving said pins.

4. A vehicle seat assembly comprising: a frame having a pair of spaced platforms, a hinge member having one end pivotally mounted on said frame, a seat supporting base member, means mounting the base member on the other end of the hinge member for selective rotation about an axis normal to the pivotal axis between the frame and said one end of the hinge member, such that pivotal movement of the hinge relative to the frame moves the base member between a first position resting on one of the platforms and a second position resting on the other platform, and said base member is selectively rotatable about said normal axis between positions facing in different directions as it moves from one to the other of said platforms, said frame including front and rear portions each having a top wall and depending side walls, the top wall of said front portion defining one of said platforms and the top wall of the rear portion defining the other of said platforms, said one end of said hinge member being pivotally mounted on the side walls of one of said front and rear portions, and slots formed in the top walls of said front and rear portions through which said other end of the hinge member projects.

References Cited
UNITED STATES PATENTS

| | | | |
|---|---|---|---|
| 2,845,990 | 8/1958 | Hubert | 297—349 X |
| 2,946,373 | 7/1960 | McCanse et al. | 248—421 |
| 3,236,556 | 2/1966 | Lathers | 297—349 |
| 3,243,228 | 3/1966 | Watts et al. | 297—92 |
| 3,300,172 | 1/1967 | Noller et al. | 248—425 |

FRANCIS K. ZUGEL, *Primary Examiner.*